(12) United States Patent
Seok et al.

(10) Patent No.: US 10,809,849 B2
(45) Date of Patent: Oct. 20, 2020

(54) TOUCH CONTROL DEVICE

(71) Applicants: HYUNDAI MOTOR COMPANY, Seoul (KR); KIA MOTORS CORPORATION, Seoul (KR)

(72) Inventors: Donghee Seok, Suwon-si (KR); Gideok Kwon, Seoul (KR); Jong Bok Lee, Suwon-si (KR); HeeJin Ro, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/178,466

(22) Filed: Nov. 1, 2018

(65) Prior Publication Data

US 2019/0171330 A1 Jun. 6, 2019

(30) Foreign Application Priority Data

Dec. 2, 2017 (KR) ........................ 10-2017-0164694

(51) Int. Cl.
*G06F 3/041* (2006.01)
*H01R 13/66* (2006.01)
*H01R 9/24* (2006.01)
*G06F 3/044* (2006.01)
*H01R 29/00* (2006.01)

(52) U.S. Cl.
CPC ............ *G06F 3/0416* (2013.01); *G06F 3/044* (2013.01); *G06F 3/04162* (2019.05); *H01R 9/2408* (2013.01); *H01R 13/6675* (2013.01); *H01R 13/6683* (2013.01); *H01R 29/00* (2013.01)

(58) Field of Classification Search
CPC .... G06F 3/0416; G06F 3/04162; G06F 3/044; H01R 13/6683; H01R 9/2408; H01R 13/6675; H01R 29/00
See application file for complete search history.

(56) References Cited

U.S. PATENT DOCUMENTS

| | | | | |
|---|---|---|---|---|
| 2013/0332542 | A1* | 12/2013 | Foo | ........................ G06F 13/385 709/206 |
| 2014/0223037 | A1* | 8/2014 | Minoo | .................. G06F 1/1632 710/16 |
| 2014/0287601 | A1* | 9/2014 | Suh | ..................... H01R 13/6205 439/39 |
| 2015/0077926 | A1* | 3/2015 | Schneider | ............. G06F 1/1632 361/679.41 |
| 2017/0048370 | A1* | 2/2017 | Kim | .................... H04M 1/7253 |

\* cited by examiner

*Primary Examiner* — Premal R Patel
(74) *Attorney, Agent, or Firm* — Brinks Gilson & Lione (57) ABSTRACT

Disclosed is a touch control device comprising at least two modules. A touch control device includes a submodule having a first housing, a first sensor electrode formed on at least one face of the first housing, and a first sensor integrated circuit (IC) detecting a change in permittivity of the first sensor electrode, and a main module having a second housing detachably coupled to the first housing, a second sensor electrode formed at least one face of the second housing, a second sensor IC detecting a change in permittivity of the second sensor electrode, a power supplier provided to supply power to the submodule, a communication module provided to communicate with an external device, and a controller configured to control the external device based on the change in permittivity of the second sensor IC.

13 Claims, 11 Drawing Sheets

TOUCH CONTROL DEVICE

CROSS-REFERENCE TO RELATED APPLICATION

This application is based on and claims priority under 35 U.S.C. § 119 to Korean Patent Application No. 10-2017-0164694 filed on Dec. 2, 2017, in the Korean Intellectual Property Office, the disclosure of which is incorporated herein by reference in its entirety.

BACKGROUND

1. Field

The present disclosure relates to a touch control device, and more particularly, to a touch control device capable of being assembled and disassembled.

2. Discussion of Related Art

A touch control device is one of the devices making up an interface between an information and communication terminal with many different displays and the user. The touch control device enables the human-terminal interface when the user directly contacts or approaches a touch pad or touch screen using an input tool, such as his/her finger or a touch pen.

Recently, touch control devices provided separately from an external device have been developed. The external device may include various devices such as a vehicle, a smart phone, a television, etc. The touch control device may be connected to the external device wiredly or wirelessly, for controlling the external device by means of a touch face.

The touch control device has thus far been manufactured individually to fit the external device, so the universality has not been secured and the production efficiency has been low.

Moreover, it has been difficult for the user to arbitrarily change the size or shape of the touch control device.

The disclosure of this section is to provide background of the invention. Applicant notes that this section may contain information available before this application. However, by providing this section, Applicant does not admit that any information contained in this section constitutes prior art.

SUMMARY

The present disclosure provides a touch control device having the form of blocks to be coupled and decoupled. The present disclosure also provides a touch control device capable of being changed in size and shape according to an external device or the user's preference.

The present disclosure also provides a touch control device compatible with various external devices.

In accordance with one aspect of present disclosure, a touch control device includes a submodule having a first housing, a first sensor electrode formed on at least one face of the first housing, and a first sensor integrated circuit (IC) detecting a change in permittivity of the first sensor electrode, and a main module having a second housing detachably coupled to the first housing, a second sensor electrode formed at least one face of the second housing, a second sensor IC detecting a change in permittivity of the second sensor electrode, a power supplier provided to supply power to the submodule, a communication module provided to communicate with an external device, and a controller configured to control the external device based on the change in permittivity of the second sensor IC.

The submodule may include at least one first male connector arranged on at least one face of the first housing, and at least one first female connector arranged on at least one other face than the at least one face of the first housing.

The main module may include at least one second female connector arranged on at least one face of the second housing and formed to be detachably coupled to the first male connector, and at least one second male connector arranged on at least one other face than the at least one face of the second housing, and formed to be detachably coupled to the first female connector.

The first male connector may include a plurality of first male connectors, and the second female connector may include a plurality of second female connectors, and the main module and the submodule may be electrically coupled when one of the plurality of first male connectors and one of the plurality of second female connectors are coupled to each other.

The first female connector may include a plurality of first female connectors, and the second male connector may include a plurality of second male connectors, and the main module and the submodule may be electrically coupled when one of the plurality of first female connectors and one of the plurality of second male connectors are coupled to each other.

When the main module and the submodule are electrically coupled, the power supplier supplies power to the submodule, and the controller is configured to control the external device based on a change in permittivity of the first sensor IC and a change in permittivity of the second sensor IC.

The first housing may include a metal complex, and the first sensor electrode may be formed by metalizing an electrode recess formed by irradiating laser to an outer surface of the first housing.

The first male connector may protrude outward from at least one face of the first housing, and the first female connector may be sunken inward from other face than the at least one face of the first housing.

The first female connector may include a plurality of ribs arranged with a gap, and the second male connector may be formed to be fitted in between the plurality of ribs.

The first female connector may be arranged to correspond to the second male connector and has an insertion rib with insertion space, and the second male connector may be inserted to the insertion space to be coupled to the first female connector.

BRIEF DESCRIPTION OF THE DRAWINGS

The above and other objects, features and advantages of the present disclosure will become more apparent to those of ordinary skill in the art by describing in embodiments thereof with reference to the accompanying drawings, in which.

DETAILED DESCRIPTION OF EMBODIMENTS

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout.

An aspect of the invention provides a touch sensor device and modules (modular bricks) for constructing the touch sensor device. In certain embodiments, a touch sensor device comprises only one main module 1 and at least one submodule 2 physically connected to the main module. The main module 1 comprises at least one communication interface (device) to transmit information to an external device other than the touch sensor device. The at least one submodule does not have a communication interface to transmit information to the external device such that only the main module communicate with the external device to provide information of a touch made on a touch sensitive surface of the submodule.

Figure 1:
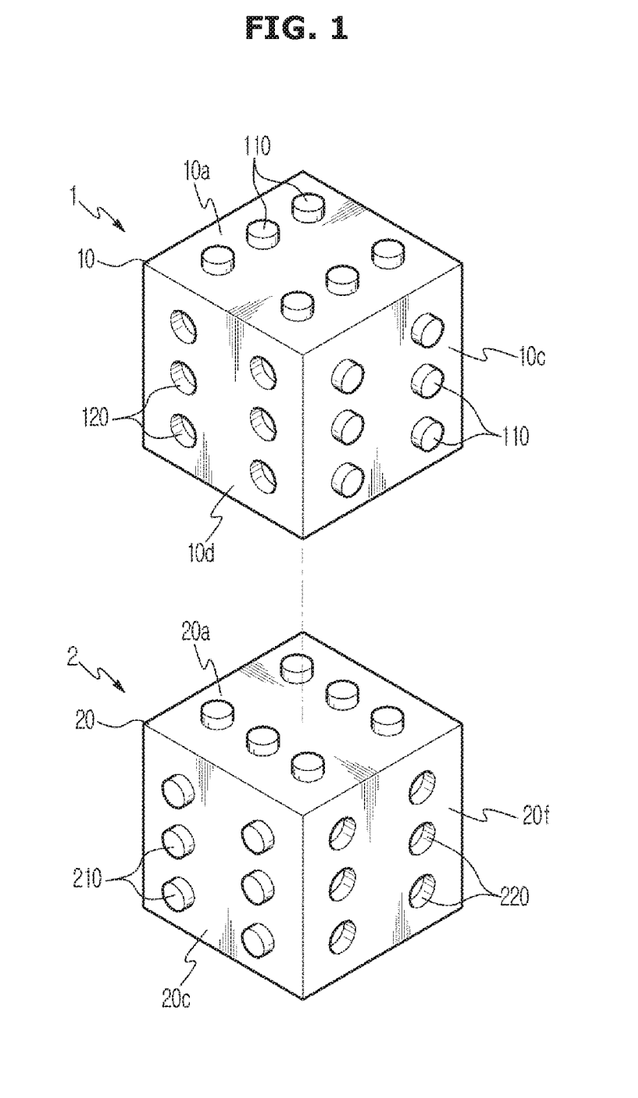
FIG. 1 shows the exterior of a touch control device, according to an embodiment of the present disclosure.
Figure 2:
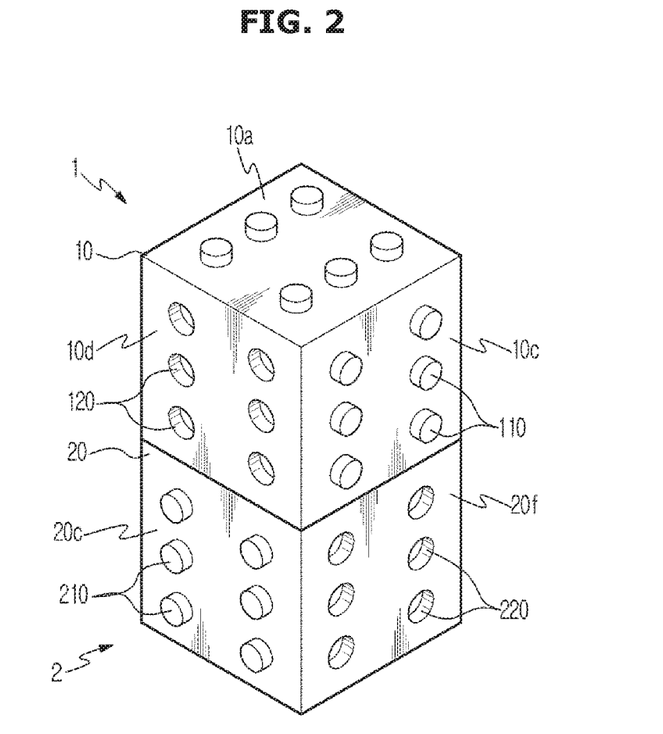
FIGS. 2 and 3 show combinations of a main module and a submodule of a touch control device, according to an embodiment of the present disclosure.
Figure 4:
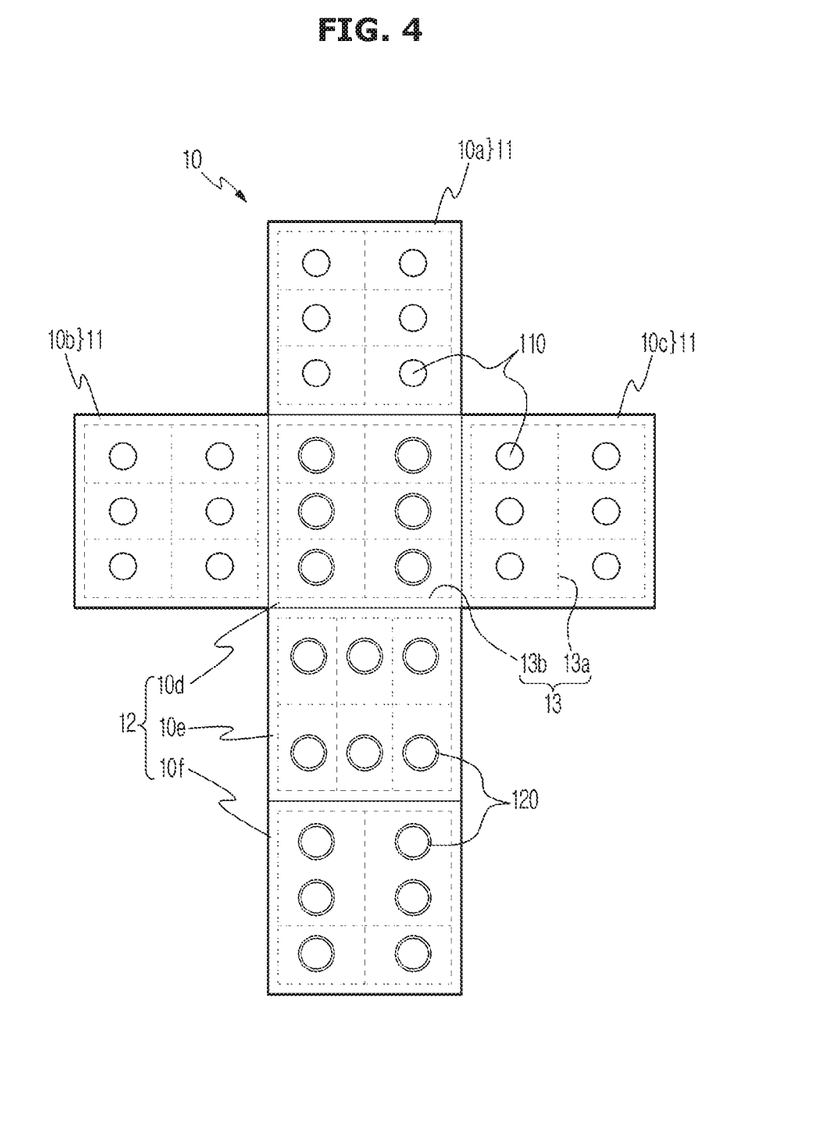
FIG. 4 is a conceptual diagram of an unfolding housing of a main module of a touch control device, according to an embodiment of the present disclosure.

In embodiments, referring to FIG. 1 and FIG. 4, the main module 1 (main brick) has a first touch sensitive surface, a plurality of stud 110 protruding from the first touch sensitive surface 10c, a second touch sensitive surface 10e, a plurality of recesses 120 formed into the second touch surface 10e for receiving studs 210 protruding from a third touch sensitive surface 20a of a submodule 2. When studs 210 of a submodule 2 are inserted into the recesses 120 of the main module 1, as illustrated in FIG. 2, a controller 103 of the main module 1 disables the second touch sensitive surface 10e (ignores signals from the surface 10e) as the second touch sensitive surface 10e is facing the submodule 2 and is not exposed to receive a touch input. In embodiments, the controller 203 (or controller 103) disables the third touch sensitive surface 20a as the third touch sensitive surface is facing the main module and is not exposed.

In embodiments, the controller 203 of the submodule 2 communicates with the controller 103 of the main module 1 when the two modules are physically coupled. However, the controller 203 (or the submodule) does not have capability to communicate with an external device other than a main module for the touch sensor device. In embodiments, when the two modules are physically coupled, in response to a touch on a first portion of sensitive touch surface 10c and a subsequent touch on a second portion of sensitive touch surfaces 20f immediately neighboring the first portion of surface 10c, the touch sensor device communicate to an external device that a single touch (across the two surface 10c, 200 has been made.

Figure 3:
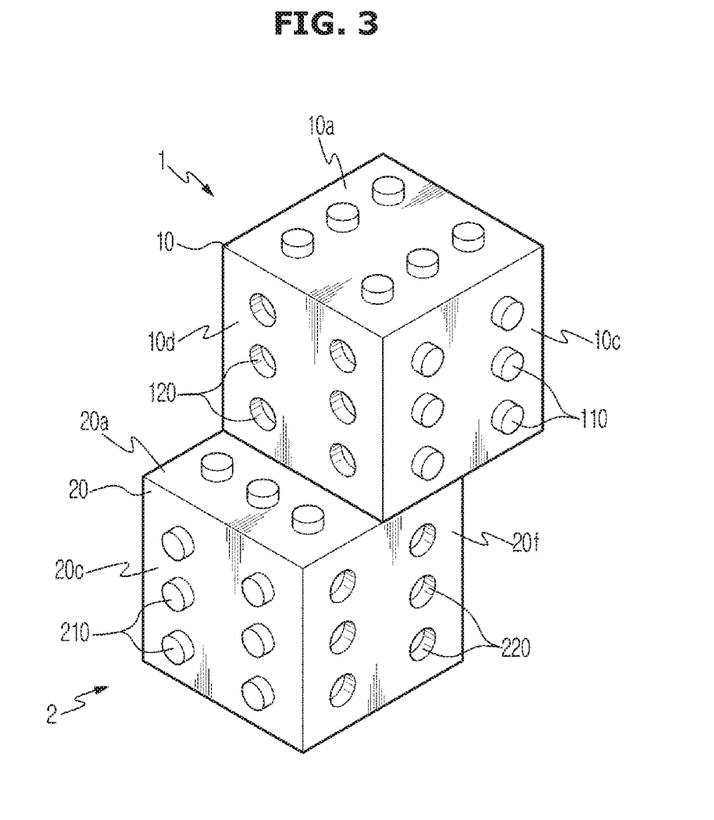

FIG. 1 shows the exterior of a touch control device, according to an embodiment of the present disclosure, and FIGS. 2 and 3 show combinations of a main module and a submodule of a touch control device, according to an embodiment of the present disclosure.

Referring to FIGS. 1 to 3, in an embodiment of the present disclosure, a touch control device 100 may include a main module 1 and a submodule 2.

In the following description, an occasion when the main module and the sub module are each provided in the singular will be focused, but the sub module may be provided in the plural in another embodiment of the present disclosure. In the latter case, for example, a single main module may be combined with two or more submodules.

The main module 1 may be independently used. The main module 1 may include a power supplier 105 (see FIG. 5) and a communication module 104 (see FIG. 5) to be independently connected to an external device (not shown) and have power without a need for an external power source.

The submodule 2, unlike the main module 1, may not be independently used. The submodule 2 may not be powered unless it is coupled to the main module 1, because the submodule 2 has no power supplier. Furthermore, the submodule 2 may not be independently connected to an external device because it has no communication module. Alternatively, like the main module 1, the submodule 2 may be provided with a power supplier and a communication module. In this case, given that the touch control device can be connected to an external device only if a single communication module is connected to the external device, it is not desirable to have a plurality of communication modules in terms of productivity and product costs. If the submodule 2 includes a power supplier, it may give the benefit of an increase in touch control use time as compared with an occasion when both the main module 1 and the submodule 2 are powered from the power supplier of the main module 1.

As shown in FIGS. 1 to 3, the main module 1 and the submodule 2 may have the same exterior. They are not, however, limited thereto, but may have different exteriors. Although not shown, in the case that a plurality of submodules are provided, the plurality of submodules may have different exteriors. In other words, there are no limitations on the shapes of the main module 1 and the submodule 2.

A first male connector 210 of the submodule 2 and a second male connector 110 of the main module 1 may be provided to have the same type, and a first female connector 220 of the submodule 2 and a second female connector 120 of the main module 1 may be provided to have the same type. This is to freely couple or decouple the main module 1 and the submodule 2.

The submodule 2 may include a first housing 20. The first housing 20 may have the form of a cube, a cuboid, or a cylinder. In the following description, as shown in the accompanied drawings, an occasion when the first housing 20 has the form of a cube will be focused.

The first housing 20 may include the first male connector 210 and the first female connector 220.

The first male connector 210 and the first female connector 220 may be formed on the outer surface of the first housing 20 and may each be in the plural.

The first male connector 210 may protrude outward from the outer surface of the first housing 20. As mentioned above, the first male connector 210 may have almost a cylindrical form, without being limited thereto.

Each of the plurality of first male connectors 210 may be provided with a combination of three wires. Specifically, the first male connector 210 may include a first wire (now shown) for data communication, a second wire (not shown) for power connection, and a third wire (not shown) for grounding. The first to third wires may extend inward from the outer surface of the first housing 20 to be connected to a controller 103 (see FIG. 5), which will be described later. Each first male connector 210 may include three wires and have a 3-pin connector structure. Since each first male connector 210 has three wires, a combination of one first male connector 210 and one second female connector 120 alone may make the main module 1 and the submodule 2 electrically connected.

The plurality of first female connectors 220 may be arranged on at least one face (side) of the first housing 20. The first female connectors 220 may be arranged on three faces of the total six faces of the first housing 20 having the form of a cuboid. It is merely by way of example, and there are no limitations on the number of faces of the first housing 20 where the first female connectors 220 are arranged.

The plurality of first female connectors 220 may be arranged across the entire area of at least one face of the first housing 20. In this case, the plurality of first female connectors 220 may be arranged in a regular pattern to be separated by a certain distance. Alternatively, the plurality of first female connectors 220 may be arranged on one side or both sides of a face of the first housing 20.

The first female connector 220 may be sunken inward from the outer surface of the first housing 20. The first female connector 220 may be sunken in the form corresponding to the second male connector 110. It is for the second male connector 110 to fit into the first female connector 220.

Each of the plurality of first female connectors 220 may be provided with a combination of three wires. Specifically, the first female connector 220 may include a first wire (now shown) for data communication, a second wire (not shown) for power connection, and a third wire (not shown) for grounding. The first to third wires may extend inward from the outer surface of the first housing 20 to be connected to a controller 103 (see FIG. 5), which will be described later. Each first female connector 220 may include three wires and have a 3-pin connector structure. Since each first female connector 220 has three wires, a combination of one first female connector 220 and one second male connector 110 alone may make the main module 1 and the submodule 2 electrically connected.

The plurality of first female connectors 220 may be arranged on at least one face of the first housing 20. The first female connectors 220 may be arranged on three faces of the total six faces of the first housing 20 having the form of a cuboid. It is merely by way of example, and there are no limitations on the number of faces of the first housing 20 where the first female connectors 220 are arranged.

The plurality of first female connectors 220 may be arranged across the entire area of at least one face of the first housing 20. In this case, the plurality of first female connectors 220 may be arranged in a regular pattern to be separated by a certain distance. Alternatively, the plurality of first female connectors 220 may be arranged on one side or both sides of a face of the first housing 20.

The main module 1 may include a second housing 10. The second housing 10 may have the form of a cube, a cuboid, or a cylinder. As described above, the structure of the exterior of the main module 1 may be the same as that of the submodule 2. Even if the main module 1 and the submodule 2 have different structures, the first male connector 210 and the second male connector 110 have the same structure and the first female connector 220 and the second female connector 120 have the same structure, so the overlapping description thereof will not be repeated.

As shown in FIGS. 1 to 3, the main module 1 and the submodule 2 may be coupled or decoupled. Furthermore, the main module 1 and the submodule 2 may be coupled in various combinations. For example, although the bottom face of the main module 1 and the top face of the submodule 2 are coupled together in FIG. 2, the top module of the main module 1 and the bottom module of the submodule 2 may be coupled in another embodiment. Besides, a side face of the main module 1 and the top face or the bottom face of the submodule 2 may be coupled in another embodiment.

In some embodiments, the main module 1 and the submodule 2 may be coupled through partial faces. As shown in FIG. 3, a partial area of the top face 20*a* of the submodule 2 may be coupled with the main module 1 while the other area of the top face 20*a* may not be coupled with the main module 1. As described above, since a combination of one first male connector 210 and one second female connector 120 or a combination of one first female connector 220 and one second male connector 110 alone may make the main module 1 and the submodule 1 electrically connected, there may be various methods for the main module 1 and the submodule 2 to be combined.

FIG. 4 is a conceptual diagram of an unfolding housing of a main module of a touch control device, according to an embodiment of the present disclosure.

In FIG. 4, the conceptual diagram is provided to illustrate the entire faces of the second housing 10 of the main module 1 in accordance with an embodiment, which may be different in practice.

As shown in FIG. 4, the second housing 10 may have a total of six faces (or sides). Among them, three faces 10*a*, 10*b*, and 10*c* may have the second male connectors 110 arranged thereon, and the remaining three faces, 10*e*, and 10*f* may have the second female connectors 120 arranged thereon. This is merely by way of example, and the number and placement of the second male connectors 110 and the second female connectors 120 may vary.

The faces 10a, 10b, and 10c where the second male connectors 110 are arranged is called a first area 11, and the faces 10d, 10e, and 10f where the second female connectors 120 are arranged is called a second area 12.

A second sensor electrode 13 may be formed on at least one face of the second housing 10.

The second sensor electrode 13 may be formed using a Laser Directing Structure (LDS) method. The LDS method refers to a method of forming a conductive structure in a region of a supporter member exposed to laser by forming the supporter member with a material including a non-conductive and chemically stable metal complex, exposing a metal seed by exposing a portion of the supporting member to laser, such as Ultra Violet (UV) laser or Excimer laser to break chemical bonding of the metal complex, and metalizing the supporting member.

The second housing 10 may be made of a substance including a metal complex. An electrode recess 14 (see FIG. 5) may be formed on the second housing 10 by exposing the second housing 10 to laser, and the electrode recess 14 may be metalized to form the second sensor electrode 13.

The second sensor electrode 13a formed in the first area 11 may be formed where the second male connectors 110 are not arranged. The second sensor electrode 13a may be formed not to join or overlap the second male connectors 110 and may be formed in the first area 11 at regular intervals.

The second sensor electrode 13b formed in the second area 12 may be formed where the second female connectors 120 are not arranged. The second sensor electrode 13b may be formed not to join or overlap the second female connectors 120 and may be formed in the second area 12 at regular intervals.

Figure 5:
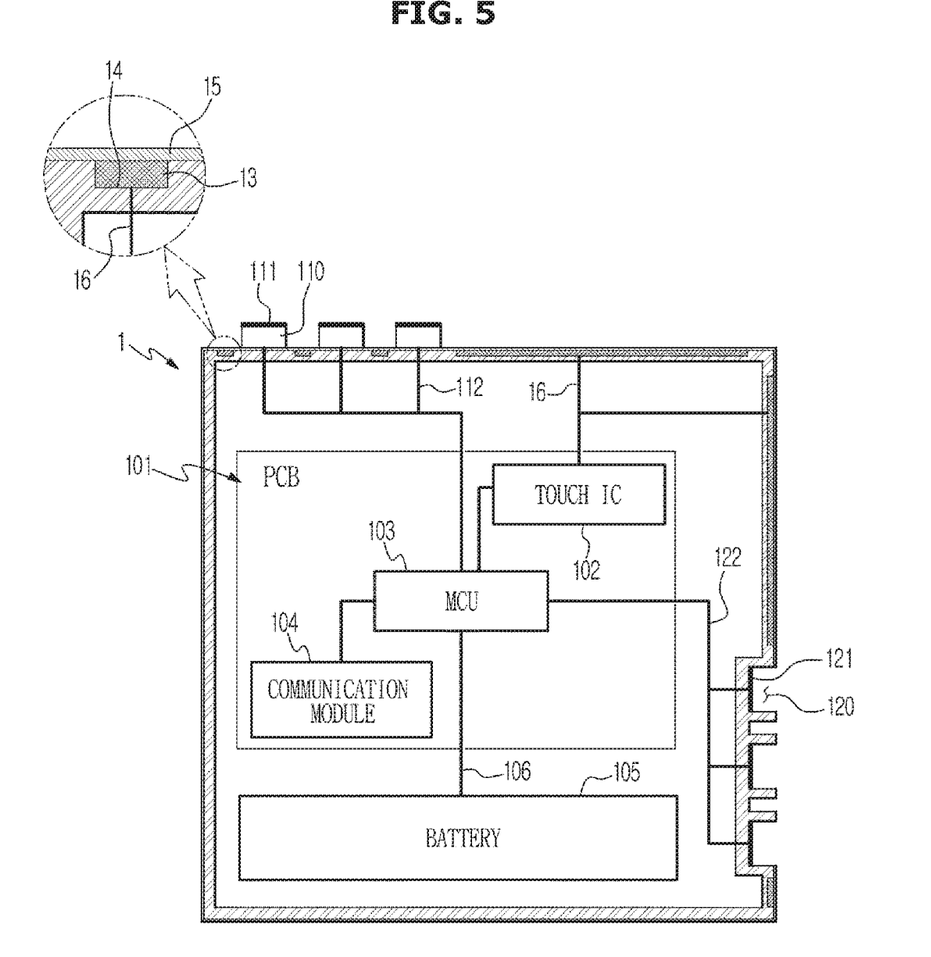
FIG. 5 conceptually shows the interior of a main module of a touch control device, according to an embodiment of the present disclosure.
Figure 6:
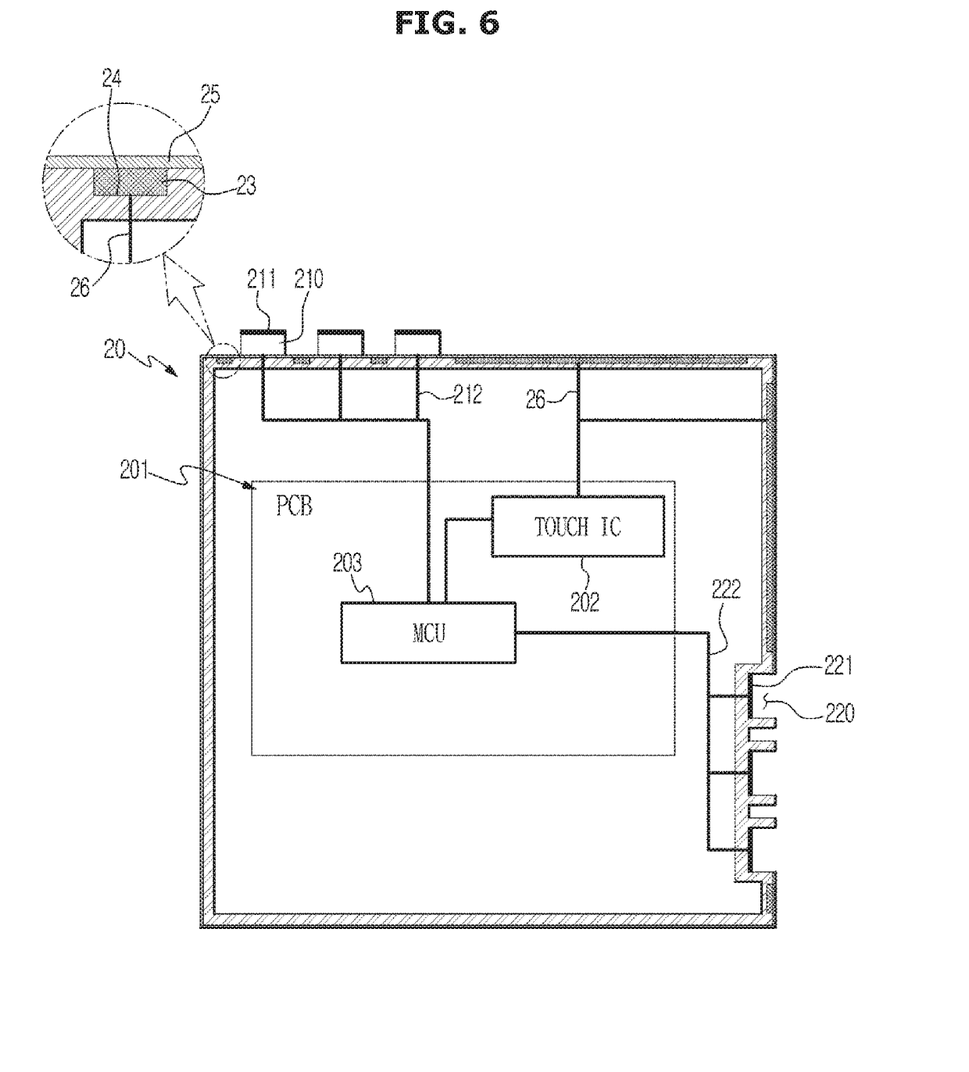
FIG. 6 conceptually shows the interior of a submodule of a touch control device, according to an embodiment of the present disclosure.

FIG. 5 conceptually shows the interior of a main module of a touch control device, according to an embodiment of the present disclosure, and FIG. 6 conceptually shows the interior of a submodule of a touch control device, according to an embodiment of the present disclosure.

Referring to FIG. 5, the main module 1 may include the second housing 10 having the second male connector 110, second female connector 120, and the second sensor electrode 13, a second printed circuit board (PCB) 101 placed inside the second housing 10, a second sensor integrated circuit (IC) 102 mounted on the second PCB 101, a second controller 103, a communication module 104, and a power supplier 105.

The second male connector 110 and the second female connector 120 may be connected to the second controller 103. The plurality of second male connectors 110 may be connected via wires 112, and the wire 112 may be connected to the second controller 103. The plurality of second female connectors 120 may be connected via wires 122, and the wire 122 may be connected to the second controller 103.

When the second male connector 110 and the first female connector 220 are coupled via the wire 112, the second controller 103 may recognize it.

When the second male connector 110 and the first female connector 220 are coupled, power may be supplied to the submodule 2 from the power supplier 105 through the wire 112.

When the second female connector 120 and the first male connector 210 are coupled via the wire 122, the second controller 103 may recognize it.

When the second female connector 120 and the first male connector 210 are coupled, power may be supplied to the submodule 2 from the power supplier 105 through the wire 122.

As shown in an enlarged portion of FIG. 5, the second electrode recess 14 may be formed by irradiating laser to the second housing 10, and the second electrode recess 14 may be metalized to form the second sensor electrode 13. A paint layer 15 may be provided on the outer surface of the second housing 10 to prevent the second sensor electrode 13 from being directly exposed to the outside.

The second sensor electrode 13 may be connected to the second sensor IC 102. A wire part 16 may be provided to connect the second sensor electrode 13 and the second sensor IC 102.

The wire part 16 may electrically connect the second PCB 101 and the second sensor electrode 13, thereby having the second sensor IC 102 mounted on the second PCB 101 and the second sensor electrode 13 electrically connected.

The wire part 16 may be provided in various ways. The wire part 16 may be formed by the LDS method or provided as a flexible PCB. Alternatively, the wire part 161 may be provided as a wire.

The second sensor IC 102 and the communication module 104 mounted on the second PCB 101 may be connected to the second controller 103. Furthermore, the power supplier 105 may be connected to the second controller 103 on the PCB 101 via a power wire part 106, or may be connected directly to the second controller 103. The second controller 103 may receive power from the power supplier 105 through the power wire part 106.

The second controller 103 may be connected to the second male connector 110, the second female connector 120, the second sensor IC 102, and the communication module 104. The second controller 103 may receive a signal from the second male connector 110 about whether the first female connector 220 is connected to the second male connector 110. The second controller 103 may receive a signal from the second female connector 120 about whether the first male connector 210 is connected to the second female connector 120.

The second sensor IC 102 may detect whether an input means, such as the user's finger is approaching or contacting the second sensor electrode 13 and send the detection result to the second controller 103. Accordingly, the second controller 103 may recognize whether the input means approaches or contacts the second sensor electrode 13.

The communication module 104 may communicate with an external device wirelessly. The communication module 104 may be connected to the external device wirelessly. Once the communication module 104 is connected to the external device, the second controller 103 may control the external device based on the signal of touch or approach to the second sensor electrode 13.

Referring to FIG. 6, the submodule 2 may include the first housing 20 having the first male connector 210, first female connector 220, and the first sensor electrode 23, a first PCB 201 placed inside the first housing 20, a first sensor IC 202 mounted on the first PCB 201, and a first controller 202. Unlike the main module 1, the submodule 2 may not include the power supplier and the communication module.

Internal configuration of the submodule 2 overlaps the internal configuration of the main module 1, so the description will not be repeated below.

Figure 7:
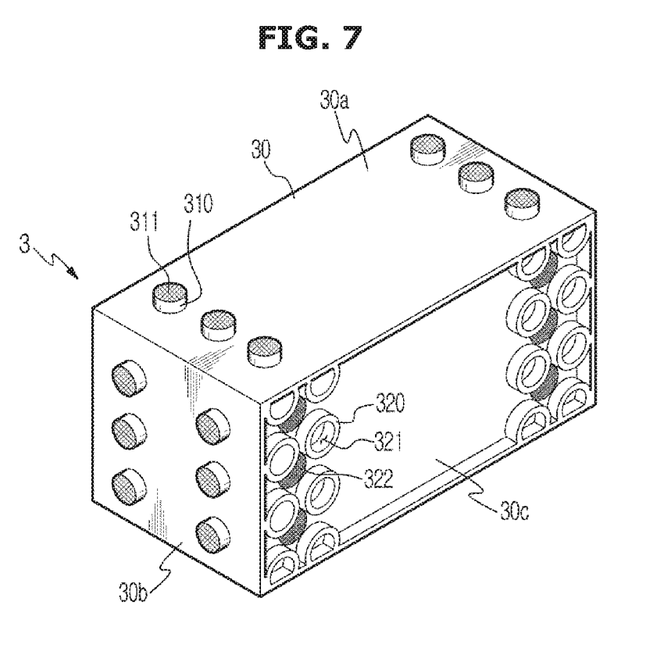
FIG. 7 shows the exterior of a touch control device, according to another embodiment of the present disclosure.
Figure 8:
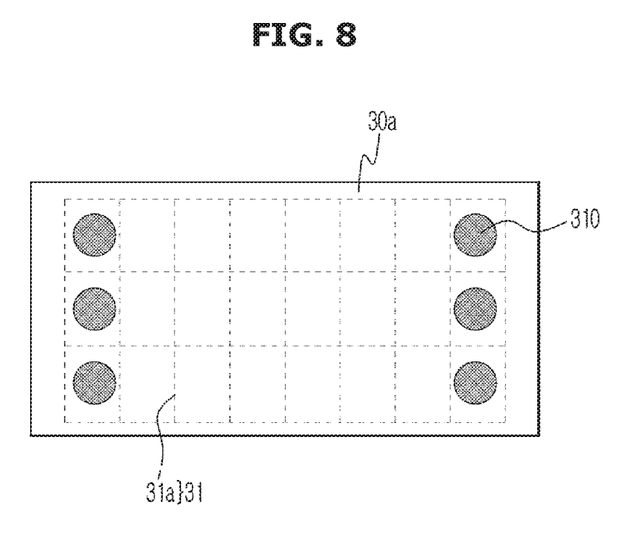
FIG. 8 is a plan view of the touch control device shown in FIG. 7.
Figure 9:
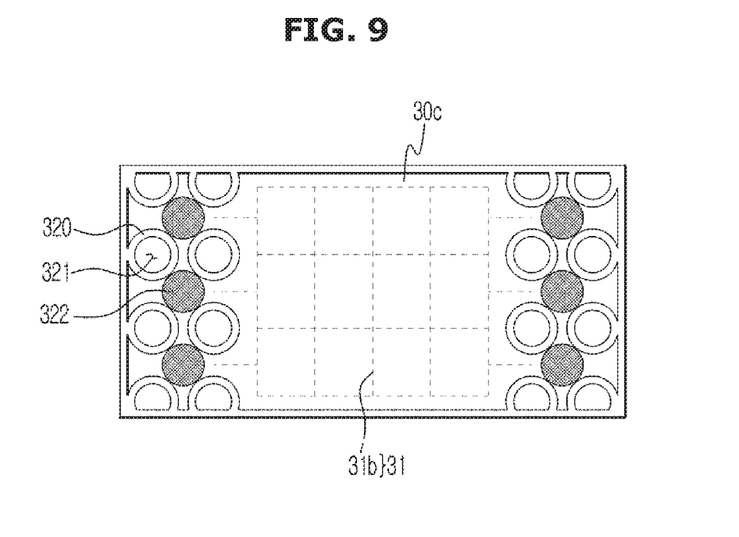
FIG. 9 is a front view of the touch control device shown in FIG. 7.

FIG. 7 shows the exterior of a touch control device, according to another embodiment of the present disclosure. FIG. 8 is a plan view of the touch control device shown in FIG. 7, and FIG. 9 is a front view of the touch control device shown in FIG. 7.

In the following description, the exterior of a module (hereinafter, called a touch module), which may be the main module or the sub module, will be explained. Internal components of the main module and the submodule are described in connection with FIGS. 1 to 6, so the overlapping description thereof will be omitted.

Referring to FIG. 7, in another embodiment of the present disclosure, a touch module 3 may include a housing 30. The housing may have the form of a cuboid, without being limited thereto.

There may be a plurality of male connectors 310 arranged on a top face 30a and a first side face 30b of the housing 30. The plurality of male connectors 310 may be arranged to be adjacent to both ends of each of the top face 30a and the first side face 30b.

The male connectors 310 may be formed to protrude from the housing 30. The male connectors 310 may each have almost a cylindrical form. A first contact portion 311 may be provided on the top of the male connector 310.

There may be a plurality of ribs 320 on a second side face 30c of the housing 30. The plurality of ribs 320 may be arranged to be adjacent to both ends of the second side face 30c, or alternatively, may be arranged across the entire area of the second side face 30c.

The plurality of ribs 320 may have the form of a cylinder with inner space 321. The inner space 321 is not used for the male connector 310 to be inserted thereto, but may be used to facilitate elastic deformation when the male connector 310 is fitted in between the plurality of ribs 320.

The plurality of ribs 320 may be arranged with certain gap. The male connectors 310 may be fitted in between the plurality of ribs 320. The gap between the plurality of ribs 320 may be smaller than the outer girth of the male connector 310. Accordingly, the male connector 310 may be fitted in between the plurality of ribs 320 by elastic deformation of the plurality of ribs 320.

Second contact portions 322 may be provided between the plurality of ribs 320 to come into contact with the first contact portion 311 when the male connector 320 is fitted in between the plurality of ribs 320.

As shown in FIGS. 8 and 9, sensor electrodes 31a and 31b may be formed on the top face 30a and the second side face 30c of the housing 30, as shown in FIGS. 8 and 9. As described above, the sensor electrode 31a may be formed not to join or overlap the male connectors 310. The sensor electrode 31b may be formed not to join or overlap the plurality of ribs 320 and the second contact portions 322.

In the embodiment of FIGS. 8 and 9, when the first contact portion 311 and the second contact portion 322 join, the main module 1 and the submodule 2 may be electrically coupled. Subsequent operation after the electrical coupling between the main module 1 and the submodule 2 is described above, so the description will not repeated below.

Figure 10:
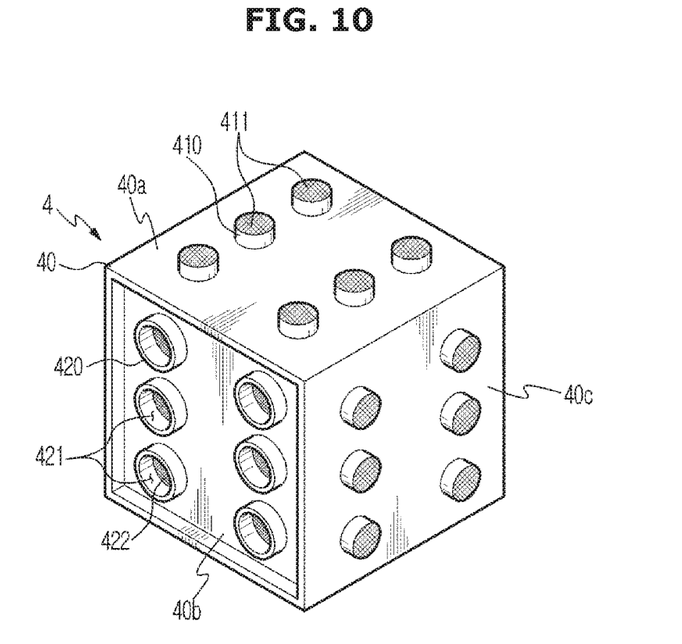
FIG. 10 shows the exterior of a touch control device, according to another embodiment of the present disclosure.

FIG. 10 shows the exterior of a touch control device, according to another embodiment of the present disclosure.

In this embodiment of the present disclosure, a touch module 4 may include a housing 40. The housing 40 may have the form of a cube, without being limited thereto.

There may be a plurality of male connectors 410 arranged on a top face 40a and a second side face 40c of the housing 40.

The male connectors 410 may be formed to protrude from the housing 40. The male connectors 410 may each have almost a cylindrical form. A first contact portion 411 may be provided on the top of the male connector 410.

There may be a plurality of insertion ribs 420 on a first side face 40b of the housing 40. The plurality of insertion ribs 420 may have the form of a cylinder with insertion space 421. The insertion space 421 may be formed to correspond to the size of the male connector 410 in order to receive the male connector 410.

When the male connector 410 is inserted to the insertion space of the insertion rib 420, the first contact portion 411 and a second contact portion 422 may join. When the first contact portion 411 and the second contact portion 422 join, the main module 1 and the submodule 2 may be electrically connected.

Figure 11:
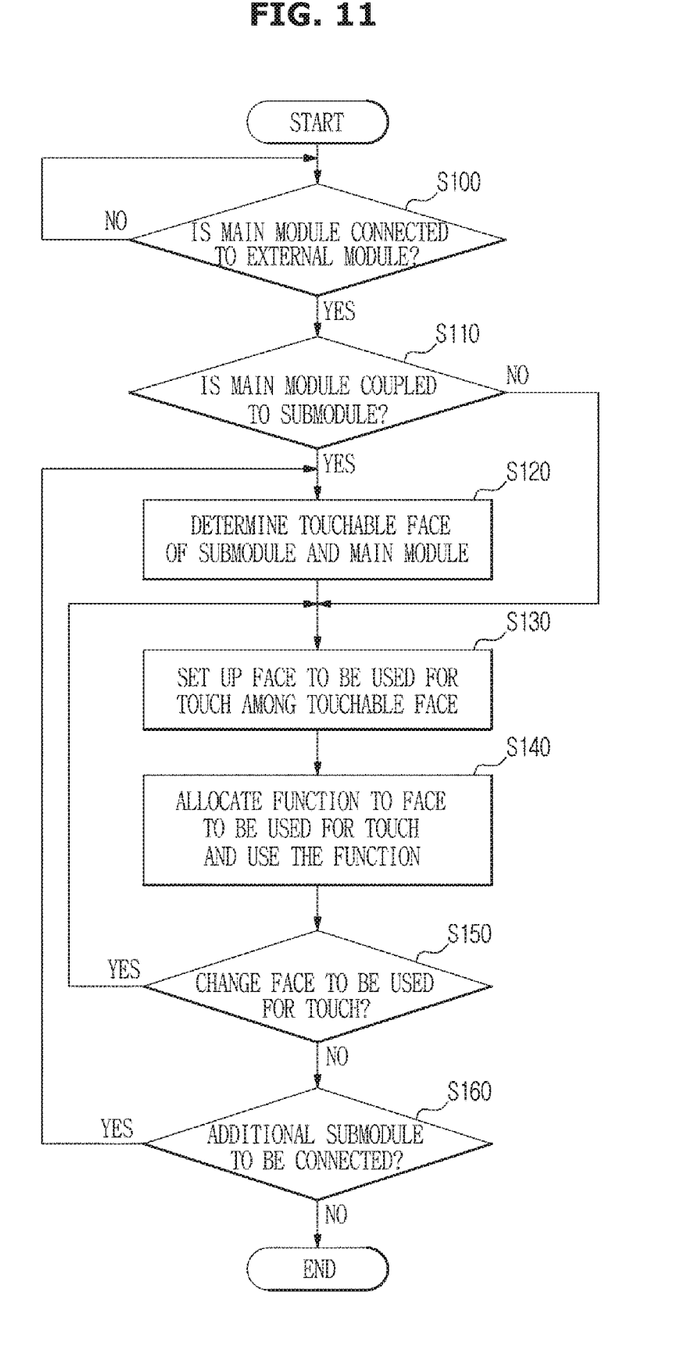
FIG. 11 is a flowchart illustrating a method for controlling a touch control device, according to an embodiment of the present disclosure.

FIG. 11 is a flowchart illustrating a method for controlling a touch control device, according to an embodiment of the present disclosure.

Referring to FIG. 11, the main module 1 may be connected to an external device. The external device may be any device. For example, the external device may include a vehicle, a smart phone, a television, etc.

The main module 1 may determine whether it is connected to the external device. The main module 1 may be connected to the external device through a communication module provided in the main module 1.

Once the main module 1 is coupled to the external device, the main module 1 determines whether it is coupled to the submodule 2, in S100, S110.

The main module 1 may be independently connected to the external device, and the submodule 2 may be connected to the external device by being coupled to the main module 1. The submodule 2 may not be independently connected to the external device.

While the main module 1 is coupled to the submodule 2, the main module 1 may determine touchable faces of the main module 1 and the submodule 2. The opposite faces of the main module 1 and the submodule 2 to be coupled may be excluded from the touchable faces.

When the main module 1 is not coupled to the submodule 2, the main module 1 may determine touchable faces of the main module 1. In this regard, the entire faces of the main module 1 may be touchable faces, in S120.

When the touchable faces are determined, the main module 1 may set up a face to be used for touch among the touchable face, in S130.

As many faces to be used for touch as the number of the touchable faces may be set up, or a smaller number of faces to be used for touch than the number of the touchable faces may be set up. The user may set up a desired face to the face to be used for touch to his or her liking.

Once the face to be used for touch is set up, the main module 1 may allocate a function to the face to be used for touch. The user may use the allocated function, in S140.

The main module 1 may allocate various functions to the face to be used for touch. For example, functions of turning on/off, channel tuning, volume control, function switching, air volume control or the like may be allocated.

If the user intends to change the number or positions of the faces to be used for touch, the main module 1 may return to the step of setting up the faces to be used for touch among the touchable faces and set up new faces to be used for touch.

Furthermore, even while the main module 1 is independently used or coupled to the submodule 2, if an additional submodule is to be coupled to the main module 1, the main module 1 may return to the step of determining touchable faces to determine touchable faces of the main module 1 and the submodule(s).

According to an embodiment of the present disclosure, a touch control device having the form of blocks to be coupled and decoupled may be provided.

According to an embodiment of the present disclosure, a touch control device capable of being changed in size and shape according to an external device or the user's preference may be provided.

According to an embodiment of the present disclosure, a touch control device compatible with various external devices may be provided.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A touch control device electrically communicating with an external device, comprising:
   a sub input module having;
      a first housing,
      a first sensor electrode respectively formed on a first face and a second face of the first housing, and
      a first sensor integrated circuit (IC) configured to detect a change in permittivity of the first sensor electrode; and
   a main input module having;
      a second housing detachably coupled to the first housing,
      a second sensor electrode respectively formed on a third face and a fourth face of the second housing and configured to change permittivity when an input means contacts or approaches at least one face among the third and fourth faces of the second housing,
      a second sensor IC configured to generate a signal corresponding to a contact or an approach of the input means by detecting a change in the permittivity of the second sensor electrode,
      a power supplier provided to supply power to the sub input module,
      a communication module provided to communicate with the external device, and
      a controller configured to control the external device based on the signal of the contact or the approach of the input means received from the second sensor IC,
   wherein when the first face of the first housing is coupled to the third face of the second housing, the controller is configured to:
      ignore an input signal from the first face and the third face, and
      define the second face and the fourth face as a touchable area of the touch control device where the change in the permittivity of the first and second sensor electrodes formed on the second and fourth faces is detected to control the external device.

2. The touch control device of claim 1, wherein the sub input module comprises:
   at least one first male connector arranged on the first face of the first housing, and
   at least one first female connector arranged on the second face of the first housing.

3. The touch control device of claim 2, wherein the main input module comprises:
   at least one second female connector arranged on the third face of the second housing and formed to be detachably coupled to the at least one first male connector, and
   at least one second male connector arranged on the fourth face of the second housing, and formed to be detachably coupled to the at least one first female connector.

4. The touch control device of claim 3, wherein the at least one first male connector comprises a plurality of first male connectors,
   wherein the at least one second female connector comprises a plurality of second female connectors, and
   wherein the main input module and the sub input module are electrically coupled when one of the plurality of first male connectors and one of the plurality of second female connectors are coupled to each other.

5. The touch control device of claim 4, wherein when the main input module and the sub input module are electrically coupled, the power supplier supplies power to the sub input module, and the controller is configured to control the external device based on a signal corresponding to the detected change in the permittivity of the first sensor electrode and the signal of the contact or the approach of the input means received from the second sensor IC.

6. The touch control device of claim 3, wherein the at least one first female connector comprises a plurality of first female connectors,
   wherein the at least one second male connector comprises a plurality of second male connectors, and
   wherein the main input module and the sub input module are electrically coupled when one of the plurality of first female connectors and one of the plurality of second male connectors are coupled to each other.

7. The touch control device of claim 3, wherein the first housing comprises a metal complex, and
   wherein the first sensor electrode is formed by metalizing an electrode recess formed by irradiating laser to an outer surface of the first housing.

8. The touch control device of claim 3, wherein the at least one first female connector comprises a plurality of ribs arranged with a gap, and
   wherein the at least one second male connector is formed to be fitted in between the ribs of the plurality of ribs.

9. The touch control device of claim 3, wherein the at least one first female connector is arranged to correspond to the at least one second male connector and has an insertion rib configured to form an insertion space, and
   wherein the at least one second male connector is inserted into the insertion space to be coupled to the at least one first female connector.

10. The touch control device of claim 2, wherein the at least one first male connector protrudes outward from the first face of the first housing, and
    wherein the at least one first female connector is sunken inward from the second face of the first housing.

11. A touch control device electrically communicating with an external device, comprising:

a sub input module having:
- a first housing,
- a first sensor electrode respectively formed on a first face and a second face of the first housing, and
- a first sensor integrated circuit (IC) configured to detect a change in permittivity of the first sensor electrode; and a main input module having:
- a second housing detachably coupled to the first housing,
- a second sensor electrode respectively formed on a third face and a fourth face of the second housing and configured to change permittivity when an input means contacts or approaches at least one face among the third and fourth faces of the second housing,
- a second sensor IC configured to generate a signal corresponding to a contact or an approach of the input means by detecting a change in the permittivity of the second sensor electrode,
- a communication module provided to communicate with the external device, and
- a controller configured to control the external device based on the signal of the contact or the approach of the input means received from the second sensor IC, wherein when the first face of the first housing is coupled to the third face of the second housing, the controller is configured to:
- ignore an input signal from the first face and the third face, and
- define the second face and the fourth face as a touchable area of the touch control device where the change in the permittivity of the first and second sensor electrodes formed on the second and fourth faces is detected to control the external device.

12. The touch control device of claim 11 further comprises a power supplier provided to supply power to the main input module and disposed outside the main input module and the sub input module.

13. The touch control device of claim 12, wherein the power supplier configured to supply power to the main input module and the sub input module.

* * * * *